Nov. 26, 1963
S. F. GUGGENHEIM ETAL
3,112,465
GANGED POTENTIOMETER STRUCTURE
Filed March 23, 1962
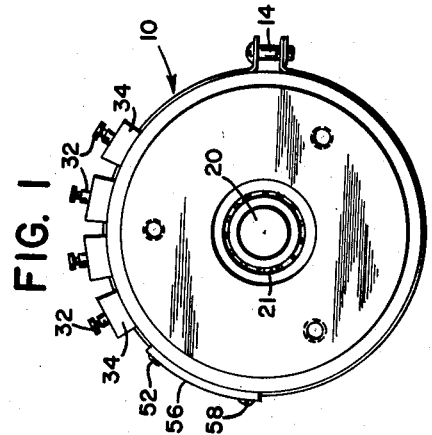
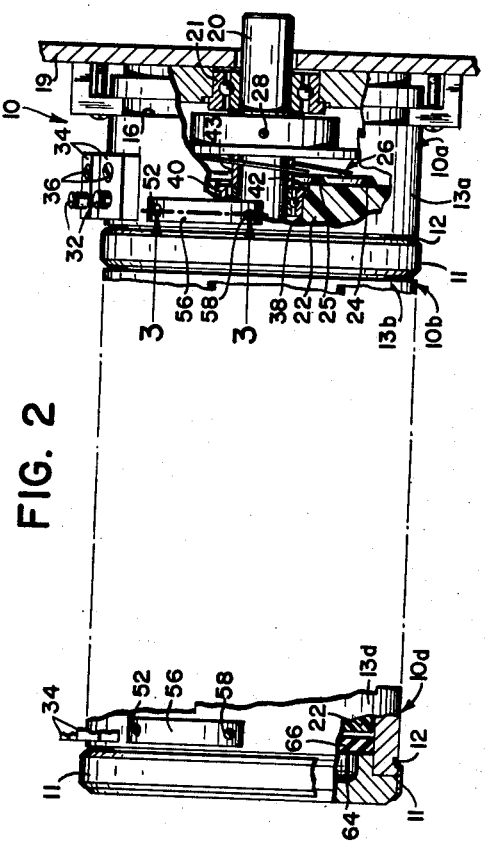
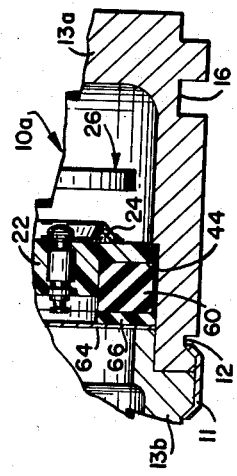
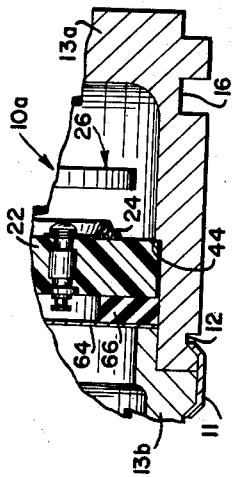
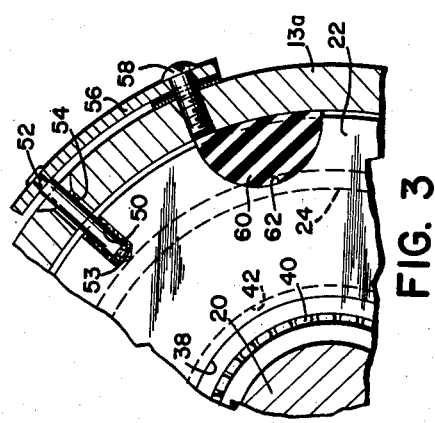
INVENTORS
S. FREDERIC GUGGENHEIM
HANS WORMSER
BY
Leonard H. King
ATTORNEY United States Patent Office 3,112,465
Patented Nov. 26, 1963

3,112,465
GANGED POTENTIOMETER STRUCTURE
S. Frederic Guggenheim, 101 Grayson Place, Teaneck, N.J., and Hans Wormser, 356 Shea Drive, New Milford, N.J.
Filed Mar. 23, 1962, Ser. No. 181,917
4 Claims. (Cl. 338—132)

This invention relates to ganged potentiometers employing a common actuating shaft.

In many electronic and electromechanical devices it is customary to assemble together three, four, or even more individual potentiometer elements in individual housings (commonly called "cups") to operate in unison from a common shaft. The precision, or linearity, with which the output of a given potentiometer relates to the rotational position of the shaft is a matter of great concern. A linearity of 0.2% or better is a common requirement. In such precision applications, certain common characteristics of prior ganged structures have been subject to mechanical difficulty tending to undesirably affect performance. For example, the successive cups tend to move out of line with one another so that the cups present an irregular staggered arrangement, a "Tower of Pisa" effect, or a banana shape. The movement out of line is due to the gradual accumulation of tolerances and clearances. Thus, if a stiff shaft is employed which is mounted in bearings carried by the end cups, then the intermediate cups will be eccentric with respect to the shaft. The eccentricity between the shaft and the conventional resistance track causes deviation from linearity in the instrument output. There is also the danger, to which long shafts are particularly prone, of the shaft bending during assembly or use, again producing eccentricity and error.

The present invention employs floating resistance elements which are mounted on the shaft whereas in prior devices, generally the resistance element is supported from the housing.

Accordingly, it is a general object of the invention to provide an improved stacked potentiometer assembly.

It is another object to provide an improved multi-element precision potentiometer.

Still another object is to provide a stacked potentiometer assembly in which the degradation of linearity resulting from eccentricity of individual cups is minimized.

A specific object of this invention is to provide a stacked potentiometer assembly in which the individual resistance elements are carried through suitable bearing members by the common shaft.

These and other features, objects and advantages of the invention will, in part, be pointed out with particularity, and will, in part, become obvious from the following more detailed description of the invention, taken in conjunction with the accompanying drawing, which forms an integral part thereof.

In the various figures of the drawing like reference characters designate like parts.

In the drawing:

FIG. 1 is a front view of a ganged potentiometer assembly employing an embodiment of this invention.

FIG. 2 is a side elevation, partially broken away, of the ganged potentiometer assembly of FIG. 1.

FIG. 3 is an enlarged fragmentary section taken along line 3—3 of FIG. 2.

FIG. 4 is an enlarged fragmentary section of a potentiometer showing vibration damping means which may be used in conjunction with this invention; and FIG. 5 is a view, similar to FIG. 4, of an alternative embodiment.

In FIGS. 1 and 2, there is shown a ganged potentiometer assembly 10, the individual potentiometers 10a . . . 10d, being externally secured to each other by means of conventional clamp rings 11 seated in grooves 12 of potentiometer housings 13a, 13b, etc., by means of clamp screws 14. The entire potentiometer assembly 10 may be mounted in a panel 19 by means of conventional servo clamps secured in external groove 16 of potentiometer housing 13a. It will be appreciated that other conventional mounting means may be provided for securing the potentiometer 10 directly to panel 19. Centrally located, and passing through each potentiometer, is a main shaft 20. For simplicity of description, the construction of only one potentiometer in the ganged assembly will be discussed hereinafter, it being understood that each successive unit in the gang is substantially similar in construction and method of mounting for rotation with shaft 20. As shown in potentiometer 10a of FIG. 2, there is mounted concentric with shaft 20 a circular track support member 22 made of an insulating plastic such as phenol formaldehyde having molded thereon a conductive plastic resistance track 24. Suitable plastic compositions are well known to the art. Conventional wiper assembly 26, fixed to shaft 20 by means of set screw 28, interconnects a resistance track 24 and a low resistance conductive plastic takeoff track 25, and provides a complete electrical circuit when connected by suitable wires secured to terminals in both tracks 24 and 25 and terminals 32 mounted in terminal blocks 34 secured to the outer surface of potentiometer housings 13a, 13b, etc., by screws 36. Track support 22 has therein a central bore 38 sufficiently large to accommodate a ball bearing 40, the outer race of which is tight in bore 38 and constrained from axial movement by shoulder 42 formed in track support 22. The inner race is tight on shaft 20 and restrained from axial movement by sleeve 43 and wiper assembly 26, fixed to shaft 20 by set screw 28. In addition, track support 22 is seated on shoulder 44 formed on the inside of potentiometer housing 13a (FIGS. 4 and 5). Means to resiliently retain track support 22 will be discussed later.

In prior art devices, the track support assembly was rigidly secured to the potentiometer housing and was independent of the central shaft which rotated within it. Previously, in the case of a ganged assembly where the shaft was rather long compared to its diameter, there was a tendency for the successive housings to move out of line with one another resulting in an irregular or staggered arrangement. The housings may have also assumed a curvilinear pattern with respect to a shaft rigidly mounted in bearings at its extremities. Either case resulted in an eccentricity between the shaft, the wiper assembly and the resistance track, with a resultant loss of linearity. The construction of this invention obviates this undesirable result. There is assured a high degree of concentricity of the shaft 20 and its attached wiper assembly with track 24 mounted on track support 22. This is achieved by having each individual potentiometer element in the gang supported on its own bearing and against a shoulder of the housing, as hereinbefore described. The first and last potentiometer housings are, in addition, provided with conventional bearings 21 (only one shown) at the extremities of the gang assembly. Since the potentiometer elements are directly associated with the shaft, there are provided resilient means to allow the elements to float on the shaft in the housings. The housing may assume a position other than a straight line or the shaft may be slightly bent without appreciable increase in linearity error due to eccentricity between element and shaft.

As seen in FIG. 3, there is provided a radial hole 50 in track support member 22. Pin 52 is secured in hole 50 by means of a suitable cement 53 such as an epoxy resin. Pin 52 may be press fit in track support member 22 but since this is a more costly operation in plastic, the use of the epoxy resin is preferred. The other end of pin 52 passes through clearance hole 54 in potentiometer housing 13a to be secured to arcuate leaf spring 56 by staking, peening or other suitable means. At its opposite end, leaf spring 56 is fastened to potentiometer housing 13a by means of screw 58. This construction prevents angular movement of the potentiometer elements with respect to the central shaft while permitting the housing limited radial play due to the flexibility of leaf spring 56.

FIGS. 3, 4 and 5 illustrate shock and vibration damping means for track support 22. Rubber bumpers 60 are secured in mating arcuate cutouts 62 in the backface of track support 22 and extend to the inner wall of the housing, as shown typically in FIG. 3. Sandwiched between cover plate 64, abutting a shoulder in the next adjacent cup and bumper 60, is an additional resilient ring 66 made of rubber. For reasons of economy or space limitations, bumper 60 may be omitted and ring 66 relied on to provide adequate clamping, as shown in FIG. 5.

The preferred embodiment of the invention disclosed employs a conductive plastic resistance element and takeoff. However, it is to be understood that wire wound, metal film, and other types of resistance elements may be substituted and other minor changes made without departing from the spirit of the invention.

Having thus disclosed the best embodiment of the invention presently contemplated, what is claimed is:

1. A ganged potentiometer having a common shaft extending along an axis, and a plurality of cups assembled in juxtaposition along said axis, each of said cups comprising:
   a cylindrical housing concentric about said axis;
   a resistance element supporting member provided with a central bore, said supporting member being positioned in said housing and adapted to be radially movable relative to said housing;
   means restraining said supporting member against axial and rotational movement relative to said axis;
   an annular resistance element carried by said supporting member concentrically with said central bore;
   a bearing positioned in said central bore having an inner race carried by said common shaft and an outer race carried by said supporting element;
   electrically conductive wiper means supported from said shaft for rotation therewith, said wiper means being adapted for traversing said resistance element;
   means for electrically connecting said resistance element to an external circuit; and
   means for electrically connecting said wiper means to an external circuit.

2. The apparatus of claim 1 wherein said means for preventing rotation of said supporting member comprises a leaf spring having an end secured to said housing and a pin extending radially relative to said shaft, from an unsecured end of said leaf spring, said pin being anchored in said supporting member.

3. The apparatus of claim 1 wherein said cylindrical housing includes an end wall and a step in an inner wall and resilient means acting in cooperation with said end wall for axially biasing said support member against said step in the inner wall of an adjacent housing.

4. The apparatus of claim 1 including shock absorbing means comprising resilient pads positioned on the backface of said support member and interposed between said support member and the inner wall of said cylindrical housing.

References Cited in the file of this patent
UNITED STATES PATENTS

| | | |
|---|---|---|
| 1,973,453 | Whiting | Sept. 11, 1934 |
| 2,401,037 | Arvin | May 28, 1946 |
| 3,027,530 | Shea | Mar. 27, 1962 |